United States Patent Office 2,809,168
Patented Oct. 8, 1957

2,809,168

DEFOAMING COMPOSITION AND PROCESS

Robert J. Hlavacek, Clarendon Hills, Ill., assignor to Swift & Company, Chicago, Ill., a corporation of Illinois No Drawing. Application September 4, 1952, Serial No. 307,929

6 Claims. (Cl. 252—321)

This invention relates in general to defoaming and in particular provides an improved defoamer and method of abating or destroying the formation of foam. The defoamer and the process of the invention are especially adapted for use in fermentation processes, for example, yeast fermentation and penicillin manufacture.

Many substances have the tendency to foam or froth when subjected to agitation or heat or other conditions of operation necessary in manufacturing or processing of such substances. Foaming may necessitate delays in production and frequently reduces the capacity of the equipment in which the foam occurs. For these and various other reasons it is desirable to prevent and abate the formation of foam. While various defoamers have been proposed, there is an ever-present demand for agents having improved and more efficient defoaming properties.

An object of the invention is to provide a defoaming process utilizing an improved defoaming agent.

A further object of the invention is to provide an improved antifoamer which will substantially prevent the formation of a foam.

The method of the invention broadly contemplates the treatment of a foamable solution with sugar cane oil to prevent or abate the formation of foam. Sugar cane oil may be used alone as the defoamer; however, I prefer to add a carrier, such as mineral oil, and an emulsifier. The emulsifier serves to disperse the defoaming compound in the aqueous foam media of the frothing substance, thereby effectively increasing the defoaming properties of the compound.

Sugar cane oil is the residual oil (soft fraction) remaining after the relatively hard waxes have been removed from a fraction obtained in the refining of sugar cane. The terms "soft fraction sugar cane wax" and "sugar cane oil" are used interchangeably in the literature with perhaps sugar cane oil being the preferred and more commonly used term. The oil is sold commercially and varies somewhat in composition and viscosity from batch to batch. At room temperature the oil is a liquid and ordinarily has a dark green color. The composition of a typical sugar cane oil, based on weight, is as follows:

|  | Percent |
|---|---|
| Glycerides | 65–70 |
| Sugars | 5 |
| Sterols and long chain hydrocarbons | 25–30 |

It will be understood that the above composition is only representative and that the composition may vary from that given. Any of the commercially sold sugar cane oils may be used as a component of my defoaming agent. An article entitled, "Chemical examination of sugar cane oil," discussing the chemical composition of the oil, appears in the February 1950 issue of "The Journal of the American Oil Chemist's Society," volume XXVII.

The defoaming characteristics of the oil may be enhanced by the use of a mineral oil carrier. Mineral oil used alone has no defoaming properties but when mixed with sugar cane oil the resulting composition has defoaming properties superior to 100 percent sugar cane oil. The mineral oil, which may vary considerably in viscosity, preferably falls within the range of 50–200 seconds Saybolt.

An optimum composition for a defoaming agent by weight comprises 25–45 percent sugar cane oil, with the balance of the defoaming agent being made up of mineral oil and a small amount of emulsifier.

Although various carriers may be employed, we prefer mineral oil because of its cheapness and its bland flavor. Diesel oil and fuel oil are satisfactory in some uses, but both of these latter oils have odors which are objectionable when either of the oils is incorporated as a component of a defoamer used in food processing. The term "petroleum oils" is used herein to include these various oils—mineral oil, diesel oil, fuel oil, etc.—that might be used as carriers.

I may use various emulsifiers, but one of the most satisfactory is the polyoxyethylene stearate emulsifier known as "Myrj 45" and described in the Atlas Company booklet "Atlas Surface Active Agents . . . Their Characteristics . . . the HLB System of Selection," copyrighted 1950. Another satisfactory emulsifier is made up of mono-, di-, and triglycerides in proportions of approximately 40–40–20, respectively. Other emulsifiers that may be used are the copolymers of ethylene oxide and propylene oxide sold commercially under the names of "Pluronic L 62" and "Pluronic L 64", described in the Wyandotte Chemical Corporation pamphlet entitled "Information on Application of Pluronics," dated March 1, 1952.

The following examples will specifically illustrate the composition of the several defoamers that may be used, but it should not be limited thereto:

Example I

|  | Percent |
|---|---|
| Polyoxyethylene stearate ("Myrj 45") | 5 |
| Sugar cane oil | 35 |
| Mineral oil (viscosity of 70 seconds Saybolt) | 60 |

Example II

|  |  |
|---|---|
| Copolymer of ethylene oxide and propylene oxide ("Pluronic L 64") | 5 |
| Mono-, di-, triglyceride in the approximate proportions of 40–40–20, respectively | 5 |
| Sugar cane oil | 30 |
| Mineral oil | 60 |

Example III

|  |  |
|---|---|
| Copolymer of ethylene oxide and propylene oxide ("Pluronic L 62") | 5 |
| Sugar cane oil | 25 |
| Mineral oil | 70 |

Example IV

|  |  |
|---|---|
| Polyoxyethylene stearate ("Myrj 45") | 6 |
| Sugar cane oil | 34 |
| Mineral oil | 60 |

The deforming properties of the preceding examples vary considerably, and as to which composition is the more desirable would depend on cost and the solution being defoamed. In testing the relative defoaming properties of the examples, a small volume (50 cc.) of 1 percent corn steep and 1 percent lactose solution with one drop of the defoamer being tested was placed in a laboratory defoaming tower. Air at a rate of 1000 cc. per minute was bubbled through the solution contained in the tower. Additional corn steep-lactose solution was added until a foam head of roughly 2 inches was formed. The more efficient defoaming agents required greater volumes of the corn steep-lactose solution to form the 2-inch head. Example I required the addition of 315 cc. of the corn steep-lactose solution to produce 2 inches of foam. Example II 110 cc., Example III 90 cc., and Example IV 365 cc. Without the addition of a defoamer, the aeration of 50 cc. of the corn steep-lactose solution produced approximately 20 inches of foam.

The amount of the defoaming compound needed in plant operation varies considerably depending among other things on the solution being defoamed, operating conditions, and the composition of the defoaming agent. In using the deforming compound of Example I, amounts of approximately 0.1 percent based on the weight of the solution being defoamed have proven effective in various solutions.

It should be understood that the components of the defoaming agent of the invention may be combined in varying proportions to suit the particular problem. The economies of the particular situation will ordinarily determine the amounts and the proportions of the respective ingredients employed, and in some instances the ingredients used are dictated by the particular solution being defoamed, e. g., fuel oil as a carrier is not suitable as a component of a defoamer used in food processing. The defoaming agent of Example I has proven to be very effective in abating the formation of foam in various type solutions.

In the formulation of my defoaming agent I prefer to mix weighed quantities of the sugar cane oil and mineral oil at 160–165° F. and allow the insoluble solids to settle. The supernatant liquid is then filtered and the appropriate amount of emulsifier is added to the filtered blend.

It is to be understood that the defoaming agent of the invention may be used to prevent the formation of foam as well as to destroy it. In using my defoamer it may be added prior to the inception of the foam, or it may be added after the formation of foam. The terms "defoamer" and "defoaming agent" are used throughout the specification and the following claims to define an agent which will prevent the formation of froth or foam, and also an agent which will destroy existing foam or froth.

Obviously, many modifications and variations of the invention, as hereinbefore set forth, may be made without departing from the spirit and scope thereof, and therefore only such limitations should be imposed as are indicated in the appended claims.

I claim:

1. A process for destroying foam which comprises treating the foam with sugar cane oil.

2. A process for destroying foam which comprises treating the foam with a defoaming agent, said agent comprising sugar cane oil and a liquid carrier for the oil.

3. A process for abating the formation of foam in foamable materials, which process comprises, adding to such materials an agent comprising sugar cane oil as an essential ingredient.

4. A process for destroying foam which comprises treating the foam with a defoaming agent, said agent comprising sugar cane oil, and a mineral oil as a carrier for the sugar cane oil.

5. A defoaming agent comprising sugar cane oil and a petroleum oil carrier, the sugar cane oil being present in an amount effective to suppress foaming and the carrier comprising the major part of the remaining amount of the agent.

6. A defoaming agent comprising sugar cane oil and a petroleum oil carrier, the sugar cane oil making up from about 25% to about 45% of the agent and the carrier making up the major part of the remaining amount of the agent.

References Cited in the file of this patent

UNITED STATES PATENTS

| | | |
|---|---|---|
| 2,230,556 | Zimmer et al. | Feb. 4, 1941 |
| 2,340,035 | Zimmer et al. | Jan. 25, 1944 |
| 2,346,928 | Lighthipe | Apr. 18, 1944 |
| 2,347,178 | Fritz et al. | Apr. 25, 1944 |
| 2,390,212 | Fritz | Dec. 14, 1945 |
| 2,550,450 | Brown et al. | Apr. 24, 1951 |
| 2,563,857 | McGinn | Aug. 14, 1951 |